United States Patent
Ward et al.

(10) Patent No.: US 8,646,044 B2
(45) Date of Patent: Feb. 4, 2014

(54) MANDATORY INTEGRITY CONTROL

(75) Inventors: Richard B. Ward, Redmond, WA (US);
Jeffrey Hamblin, Issaquah, WA (US);
Peter T. Brundrett, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1458 days.

(21) Appl. No.: 11/117,621

(22) Filed: Apr. 28, 2005

(65) Prior Publication Data

US 2006/0248585 A1 Nov. 2, 2006

(51) Int. Cl.
*G06F 7/04* (2006.01)

(52) U.S. Cl.
USPC ............ 726/4; 726/1; 726/2; 726/3; 726/5; 726/6; 726/7; 726/8; 726/9; 726/10; 709/225; 380/247; 380/248; 380/249; 380/250

(58) Field of Classification Search
USPC .............. 726/1–10; 709/225; 380/247–250
See application file for complete search history.

(56) References Cited

U.S. PATENT DOCUMENTS

| | | | | |
|---|---|---|---|---|
| 6,643,783 | B2 * | 11/2003 | Flyntz | 726/9 |
| 2001/0027527 | A1 * | 10/2001 | Khidekel et al. | 713/201 |
| 2002/0087894 | A1 * | 7/2002 | Foley et al. | 713/202 |
| 2002/0120858 | A1 * | 8/2002 | Porter et al. | 713/200 |
| 2002/0156929 | A1 * | 10/2002 | Hekmatpour | 709/310 |
| 2003/0110117 | A1 * | 6/2003 | Saidenberg et al. | 705/36 |
| 2004/0086091 | A1 * | 5/2004 | Naidoo et al. | 379/37 |
| 2005/0181765 | A1 * | 8/2005 | Mark | 455/411 |
| 2006/0112096 | A1 * | 5/2006 | Ahluwalia et al. | 707/6 |

* cited by examiner

*Primary Examiner* — Edan Orgad
*Assistant Examiner* — Roderick Tolentino
(74) *Attorney, Agent, or Firm* — Baker & Hostetler LLP

(57) ABSTRACT

The contemplated embodiments of the invention provide a method for implementing a mandatory integrity control (MIC) system that provides access control for each and every object and subject that need access control, but in a way that allows legacy operating systems to continue with little modification. The invention provides a novel method that selects an integrity level designator for a subject, when the subject logs onto the computer system. The selected integrity level designator is then added to an existing data structure in the computer system. The existing data structure may be a part of a security descriptor stored in a system access control list of an object. The existing data structure may be a part of a list of security permissions that constitute an access token for a process executing as a subject.

18 Claims, 5 Drawing Sheets

MANDATORY INTEGRITY CONTROL

FIELD OF THE INVENTION

The invention is related to the field of providing access control for objects in a computer system. More specifically, the invention is related to providing mandatory integrity control in a computing system environment.

BACKGROUND OF THE INVENTION

Over time, computer security has taken on many different forms. The security model presently used by most operating systems is called "Discretionary Access Control" (DAC). DAC enforces security based on ownership. Therefore, if a particular user owns a file, he has full control of the file and can set the read, write, and execute permissions for the file. DAC allows users to control the data at their discretion. The problem with the DAC model is that if a system is compromised, an attacker can take control of the system and its data simply by pretending to be the user. Alternatively, a user can be tricked into executing code from a hostile source having the full capabilities of the user. Therefore, the DAC model is limited in the ability to protect a user or system state when the user is running software at different levels of trustworthiness.

An example of the limitation of the DAC model is the potential risk to the system by any code executed by system administrators. Untrustworthy or malicious software run by an administrator can modify critical operating system configuration or image files by executing with administrator privilege.

A different security model from DAC, called "Mandatory Access Control" (MAC) provides a different mechanism for enforcing a security policy defined by the system that is not under the discretion of the user to change. MAC makes enforcement of security policies mandatory instead of discretionary, as with DAC. MAC allows security policies to be established by the system and require object owners and users to be subject to these policies. Once the security policies are in place, users cannot override them.

Mandatory Integrity Control (MIC) applies an mandatory security policy in regards to the trustworthiness of a user or application file. A MIC security policy is narrower in scope than a MAC security policy. Instead of providing security based on the sensitivity or classification of the subject and the object as with MAC, MIC enforces access security based on the integrity of the subject and the object. MIC is designed to protect the computer system and user data from unauthorized modification by untrustworthy users, or untrustworthy code run by privileged users. MIC does not address the confidentiality of data. A typical Mandatory Integrity Control implementation enforces a policy where processes of lower trustworthiness cannot modify files or system objects of higher trustworthiness, and where subjects of high trustworthiness are not compromised by accepting input of lower trustworthiness.

Traditional mandatory integrity models, while providing adequate security, have also had a number of limiting practical affects on the operation of a computer system. For example, the Biba hierarchical integrity model created in the 1970s, is a strict integrity model that limits the ability to modify an object only when a subject's integrity level dominates an object's integrity level. The Biba model also prevents a subject from reading data from a lower integrity object or writing up to a higher object integrity.

Other integrity models developed in the 1970s and 1980s provided alternative integrity models. For example, certain integrity models allowed higher integrity subjects to read or execute lower integrity objects. Other integrity models permitted modification only by "certified" programs. Nevertheless, because of challenges in the design and implementation of integrity models in commercial operating systems their use has been limited.

Therefore, there is a need to implement an integrity model in a way that does not interfere or significantly change the existing behavior of a commercial operating system. Users and programs need to use the operating system that enforces an integrity model with a high degree of compatibility with behavior of previous versions of the operating system that do not implement an integrity model. Changes in the computer security environment brought about by widespread Internet access creates a need for a security mechanism that prevents unknown, untrustworthy and potentially malicious code from modifying or deleting operating system or user data files.

SUMMARY OF THE INVENTION

The contemplated embodiments of the invention provide a method for implementing a mandatory integrity control (MIC) system that enforces a security policy that applies to every subject and object in the computer system, but does not require major changes to the operating system behavior for users or applications. The invention provides a novel method that selects an integrity level designator when a user authenticates to the computer system. The selected integrity level designator is then added to an existing data structure representing the security context of the user in the computer system. The security context of the user is a data structure referred to as a security token. As part of the novel method, the integrity level designator is added to the security token. The security token is applied to every process (or executing program) started by the user. The executing process with an associated security token is referred to as a subject in the integrity model.

In addition, an integrity level designator is added to the existing security attributes of objects that are represented in the operating system as securable resources, such as data files. The data structure representing the existing security attributes of an object include an access control list that is part of a security descriptor. Another part of the novel method is how the integrity level designator is represented in the existing access control list. The access control list contains a list of entries that have security identifiers (or security IDs). The security IDs are data structures used to identify the users or groups granted access permissions in the DAC model. Another part of novel method is using security identifiers to represent the integrity level designator. Using security identifiers as the data structure to represent the integrity level designator allows an implementation of the integrity model with minimal change to the existing subject security token and object security descriptor that are fundamental to the operating system security mechanism. The security identifier data structures permits the definition of a very large number of integrity level designations and/or integrity compartments. A simple implementation of the novel method may introduce a small number of distinct integrity level designations representing different degrees of trustworthiness, such as low, medium, high, and system.

The security reference monitor in the operating system implements the access verification checks. As part of the access verification process, a novel method uses integrity level designators in the subject security token and object security descriptor in addition to the discretionary access control information before determining the allow access permissions. The novel method includes comparing a subject's integrity level to the integrity level of an object that is to be accessed, when the subject attempts to access an object. The subject may then be granted access to the object once the MIC policy check verifies that the subject's integrity level has the appropriate relationship to the integrity level of the object, depending on the type of access requested, such as read, write or execute.

DETAILED DESCRIPTION OF ILLUSTRATIVE EMBODIMENTS

The subject matter of the invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
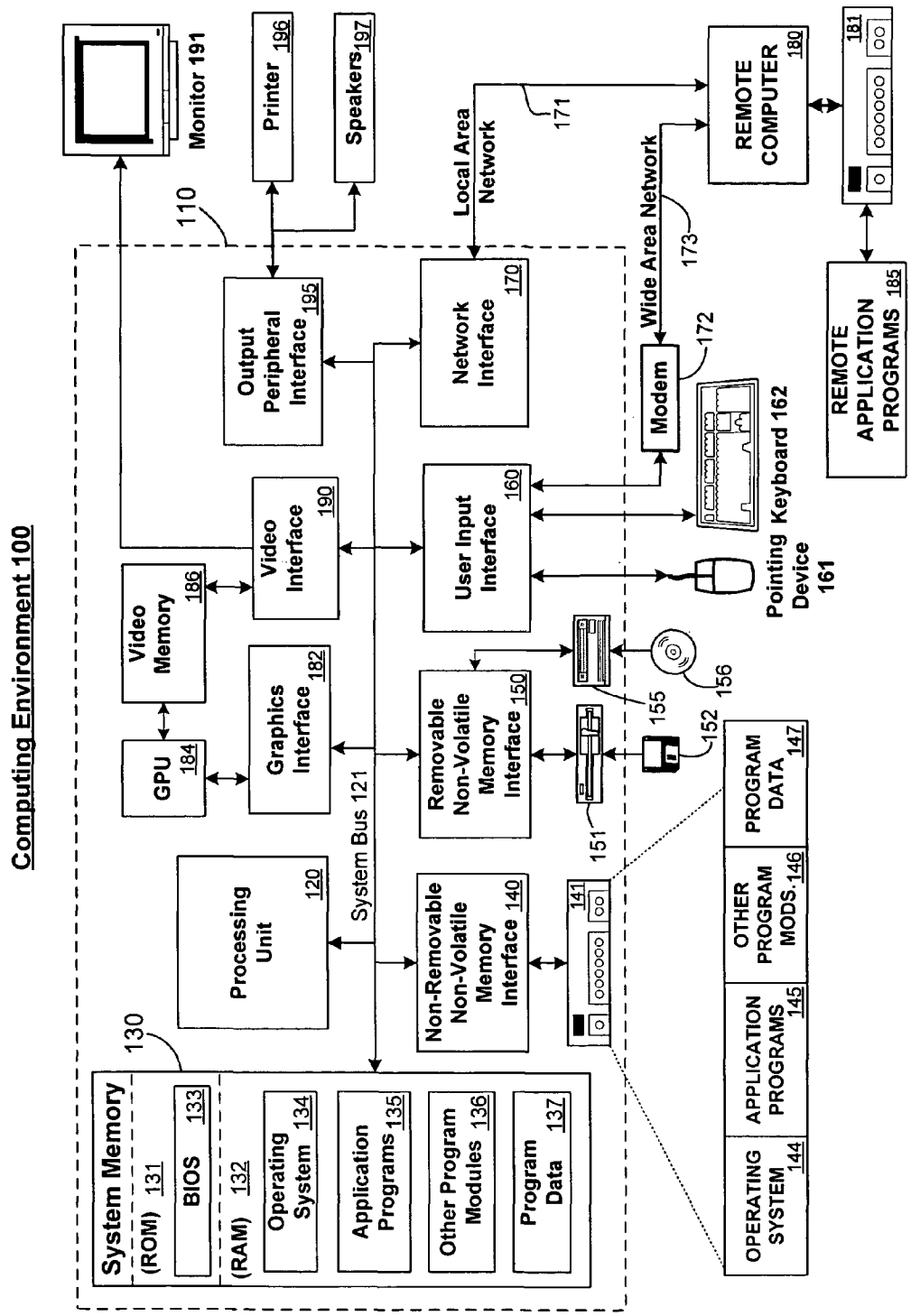
FIG. 1 is a diagram illustrating an example computing environment in which aspects of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Network Environment

Figure 2:
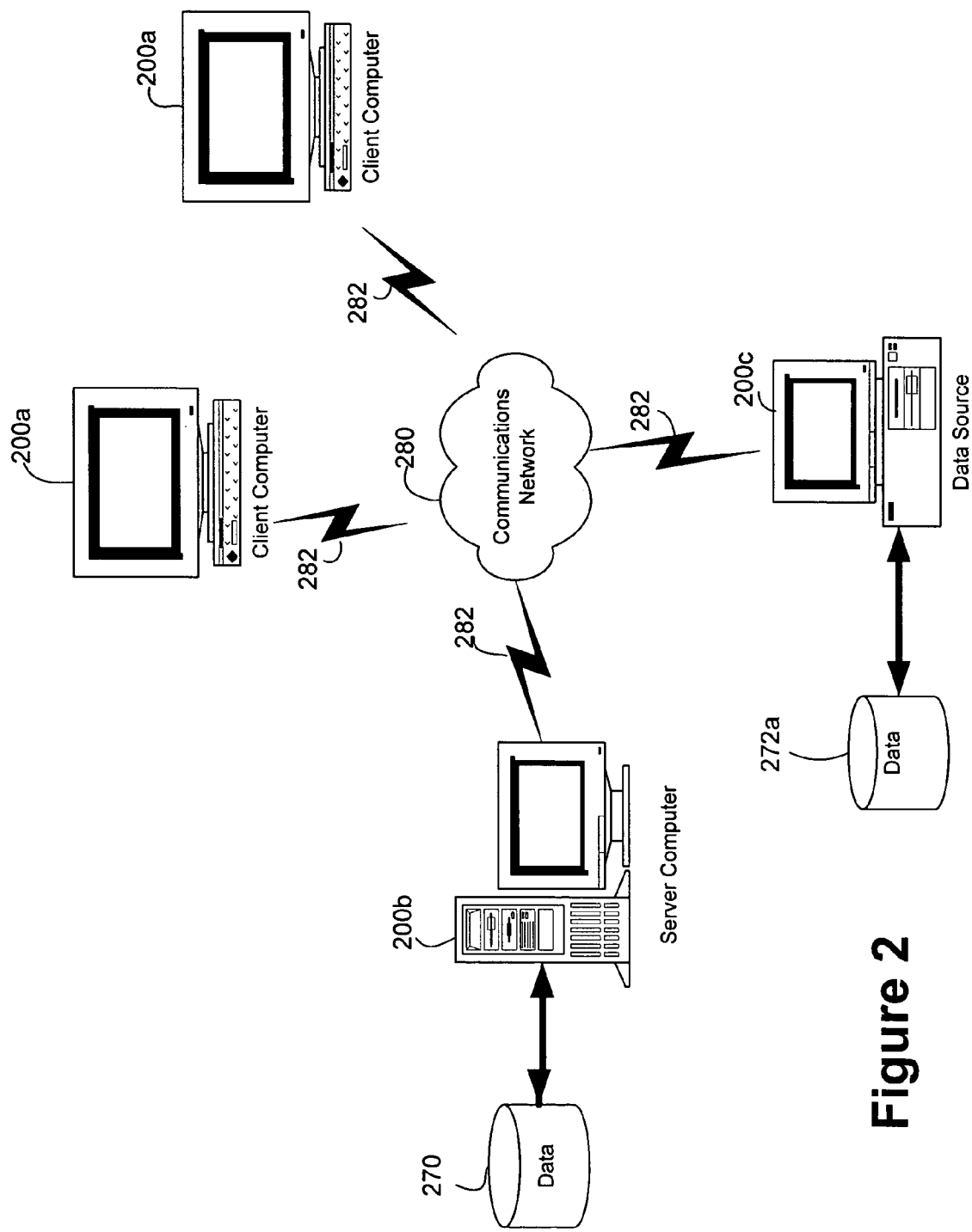
FIG. 2 is diagram illustrating an example computer network in which aspects of the invention may be incorporated.

FIG. 2 illustrates an example network environment in which the present invention may be employed. Of course, actual network and database environments may be arranged in a variety of configurations; however, the example environment shown here provides a framework for understanding the type of environment in which an embodiment may operate.

The example network may include one or more client computers 200a, a server computer 200b, data source computers 200c, and/or databases 270, 272a, and 272b. The client computers 200a and the data source computers 200c may be in electronic communication with the server computer 200b by way of the communications network 280 (e.g., an Intranet). The client computers 200a and data source computers 200c may be connected to the communications network by way of communications interfaces 282. The communications interfaces 282 can be any type of communications interfaces such as Ethernet connections, modem connections, wireless connections and so on.

The server computer 200b may provide management of the database 270 by way of database server system software or the like. As such, server 200*b* may act as a storehouse of data from a variety of data sources and provides that data to a variety of data consumers.

In the example network environment of FIG. 2, a data source may be provided by data source computer 200*c*. Data source computer 200*c* may communicate data to server computer 200*b* via communications network 280, which may be a LAN, WAN, Intranet, Internet, or the like. Data source computer 200*c* may store data locally in database 272*a*, which may be database server or the like. The data provided by data source 200*c* can be combined and stored in a large database such as a data warehouse maintained by server 200*b*.

Client computers 200*a* that desire to use the data stored by server computer 200*b* can access the database 270 via communications network 280. Client computers 200*a* access the data by way of, for example, a form, a query, etc. It will be appreciated that any configuration of computers is equally compatible with an embodiment of the present invention.

Example Embodiments

A novel method implements integrity levels using existing data structures, but uses the data structures in a new way. More specifically, the novel method uses existing security descriptor models to add integrity information.

Figure 3:
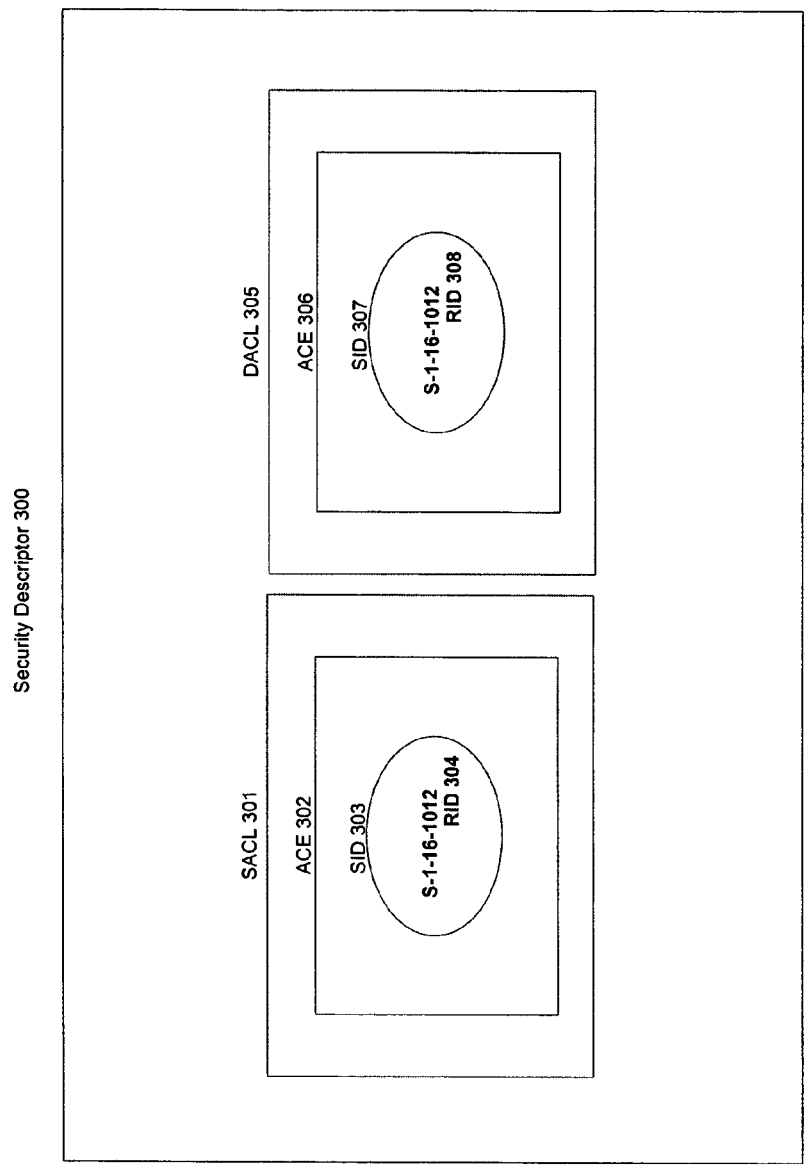
FIG. 3 provides a block diagram detailing the structure of a security descriptor, according to the invention.

FIG. 3 provides a block diagram detailing the structure of a security descriptor used in the invention. A security descriptor 300 and its associated data provides a structure that contains the security information for an object (e.g., a file, process, event, or anything else having a security descriptor). Security descriptor 300 may identify many aspects of objects, including the object's owner and primary group, for example. Security descriptor 300 also includes an access control list (ACL).

The ACL provides a list of security permissions that define the access rights granted to a user that apply to an object. There are two types of access control lists, a discretionary access control list (DACL) 305 and a system access control list (SACL) 301. Existing security descriptors contain both a DACL 305, for owner or user discretionary access, and a SACL 301, where to date, auditing information is stored. DACL 305 is an access control list that is controlled by the owner of an object and that specifies the access THAT particular users or groups can have to the object. SACL 301 is an access control list that controls the auditing of attempts to access the object. The ability to get or set an object's SACL is controlled by a privilege typically held by system administrators.

An entry in an ACL is called an access control entry (ACE) that defines access permissions for each object. The ACE also may contain an integrity level of the object. SACL 301 includes an ACE 302 and DACL 305 includes an ACE 306.

The novel method may use an existing data structure located in SACL 301 of an object's security descriptor 300, called a Security ID (SID), to represent an integrity level. A SID is a data structure having a variable length that identifies user and group accounts. Each account is issued a unique SID when the account is first created. Internal processes in Windows refer to an account's SID rather than the account's user or group name. SACL 301 has a SID 303 and DACL 305 has a SID 307. The novel method may use SID 303 in SACL 301.

SID 303 and SID 307 include a numeric value called a relative identifier (RID), RID 304 and RID 308, respectively. The RID is the portion of the SID that identifies a user or group in relation to the authority that issued the SID. The RID also can be used to define an integrity level to specify the integrity of the object. Although the integrity SID may be located in the DACL 305, keeping it as SID 303 in the SACL 301 is more secure because it prevents any user with write access to DACL 305 from modifying integrity SID 303. This is because additional security permissions are required to gain access to SACL 301.

An access token is a collection of security identifiers and their associated privileges that define the access rights for a particular user. In the security context, integrity SID 303 announces the integrity level of its associated token, which in turn determines the level of access the token will be able to achieve as defined by the integrity policy. Each token may include multiple integrity SIDs. For example, there may be a separate user interface integrity SID for certain types of applications (e.g., accessibility applications).

In operation, the operating system creates an access token when a user logs onto the computer system. It is preferable that every process executed by the user have a copy of the token. Therefore, the access token contains the relevant security information for a particular logon session. The token may identify various attributes regarding the subject including the user's designation, the user's designated groups, and the user's identified privileges. The system then uses the token to control access to objects and to control the ability of the user to perform various system-related operations.

Figure 4:
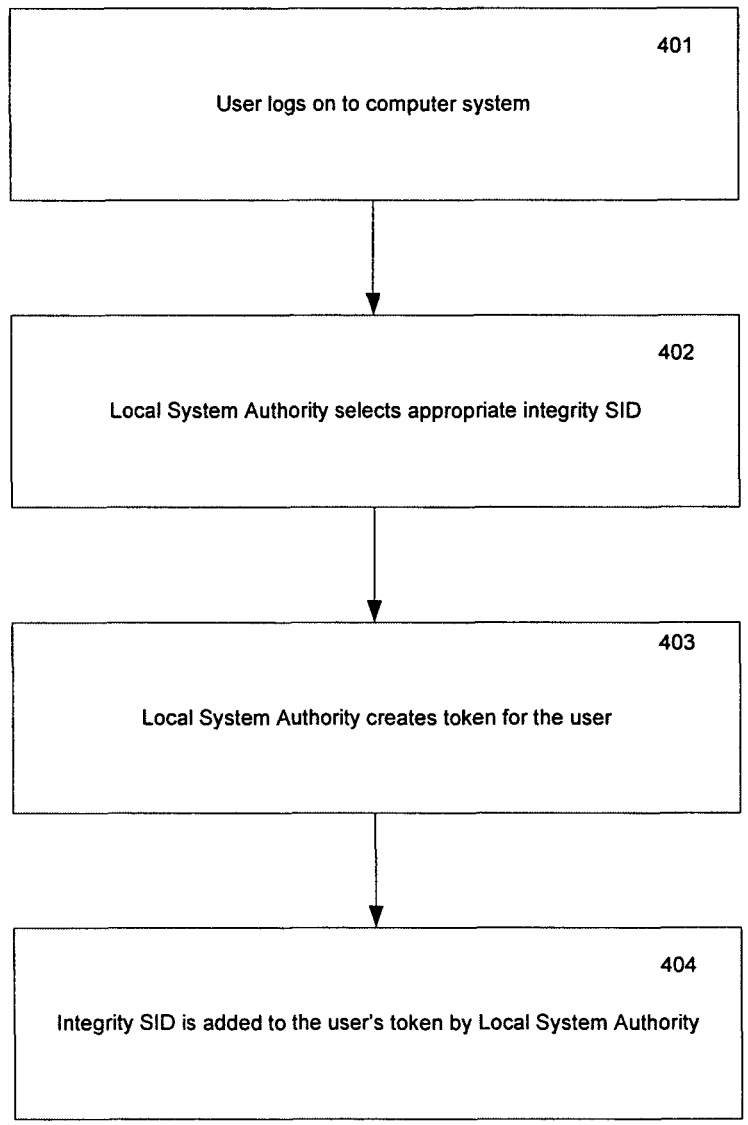
FIG. 4 is a flow diagram illustrating the process for adding an integrity SID to the user's token, according to the invention.

FIG. 4 provides a flow diagram illustrating the process for adding an integrity SID to the user's token. An initial step in implementing MIC is to add an integrity SID to the user's token. The integrity SID may be added to the user's token by the Local Security Authority (LSA) subsystem that authenticates and logs users onto the local system. The LSA selects the appropriate integrity SID when a user logs on at steps 401 and 402. The appropriate SID is determined by the token group memberships. For example, an administrator token is given a higher protection level than a normal user token. The LSA then creates the token for the user at step 403. At step 404, the integrity SID is added to the user's token by the LSA.

Implementation of the integrity SIDs may have many possible forms and hierarchies. One possible example includes the following integrity levels: system integrity, high integrity, medium integrity, untrusted integrity, and low integrity. The various applications, users and subsystems of a computer system may be categorized into each integrity level.

Integrity levels may take any form and represent any designation. For example, the local computer system may be set at system integrity level, while administrator accounts may be set at a high integrity level. Normal user accounts may be set at medium integrity level, while all other users, such as "Guest" accounts, may be set at low integrity. Also, there may be an untrusted integrity level that includes anonymous users and all other tokens.

The following are examples of integrity levels and their application to subjects and objects of the computer system. The examples are meant to further describe the invention but in no way are limiting or represent any of the many possibilities contemplated by the scope of the invention.

First, there may be a low integrity level. The low integrity level may be assigned to subjects who cannot modify anything but content created at or below the low integrity level. Also, processes may be assigned the low integrity level when the executable file loaded into the process at startup is labeled low integrity. Objects at the low integrity level typically are untrustworthy and very low assurance. For example, content downloaded from the Internet may be set at the low integrity level. In addition, user data files created by an application program running at the low integrity may be assigned the low integrity level. If an object does not have an integrity level defined in the object security descriptor, the security subsystem may assume a default low integrity level.

Next, there may be a medium integrity level. The medium integrity level may be the default integrity level of non-privileged or non-Administrative users. Also, interactive user shell processes may be created at the medium integrity level. In addition, trusted application programs executed by non-administrative users may run in a process at the medium integrity level. User data files created by processes running at the medium integrity level may be assigned medium integrity.

Next, there may be a high integrity level. The high integrity level may be assigned to processes running as administrative or full authority, as long as they execute signed code, which also is installed at the high integrity level. A high integrity level is associated with trustworthy or high assurance code. Also, services may be assigned the high integrity level. With respect to objects, the high integrity level may be assigned to signed executable components during install by a trusted operating system installer service. Also, application data created by these trusted applications (e.g., Word docs) may be created at the high integrity level. Finally, content downloaded from a Trusted Site on the Internet for example, an Internet site that uses an X.509 certificate and the SSL security protocol to authenticate the site identity may be assigned a high integrity level. High integrity applications may include program files, like Microsoft Office™, or for example applications published by other software publishers like Adobe Reader, or Intuit TurboTax, if they are signed.

Finally, there may be a system integrity level. The system integrity level may include system components running as part of a trusted computing base. Also, services running on a local system may be given a system integrity level. With respect to objects, it may be desirable to limit the system level integrity to signed images installed with the operating system.

The integrity SIDs may take various forms including form "S-1-16-xxxx" where 16 indicates that the SID is an integrity SID and where "xxxx" represents the RID. As discussed, the integrity level may be represented by a specific ACE type in the SACL of the executable file.

Figure 5:
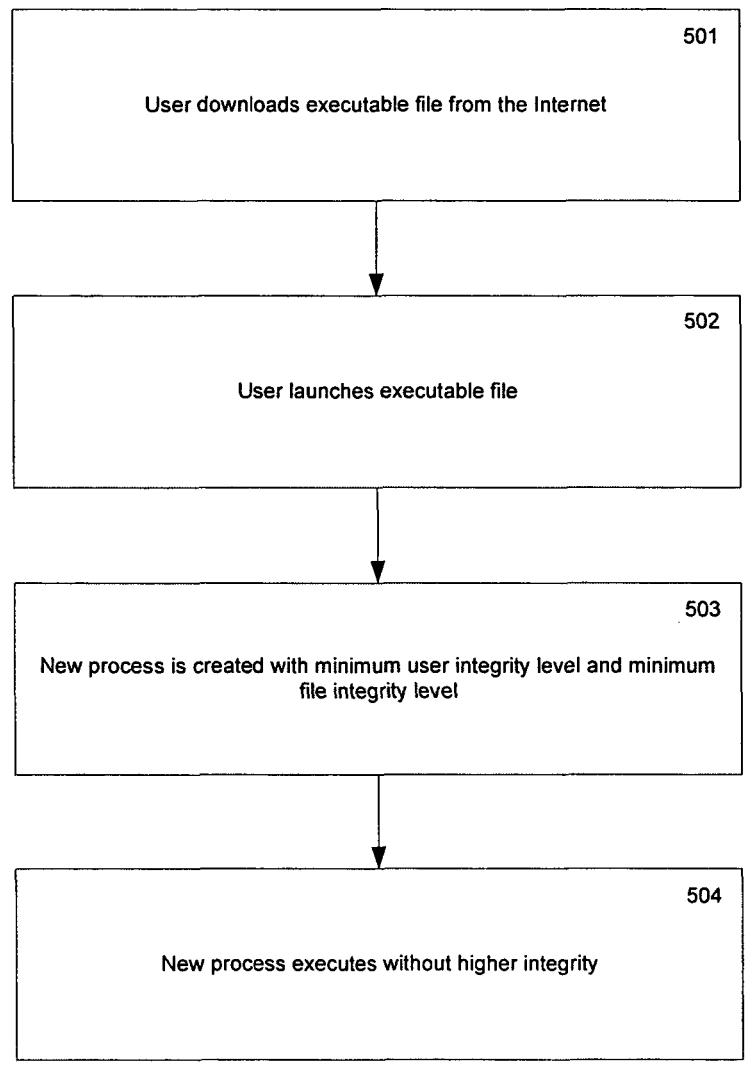
FIG. 5 provides a flow diagram of an example use of a mandatory integrity control system, according to the invention.

FIG. 5 provides a flow diagram of an example use of a mandatory integrity control system, as contemplated by the invention. In step 501, a user downloads an executable file from the Internet. When the user attempts to launch the executable file in step 502, a new process is created with the minimum user integrity level and the minimum file integrity level in step 503. As a result, the newly created process will not execute with a higher integrity than the executable file itself, as indicated in step 504.

For example, if an administrator with a high integrity level executes a low integrity program, such as a program downloaded from the Internet, the token for the newly created process will operate with the lower integrity level. Therefore, the administrator who launches the untrustworthy code is protected from any damaging or malicious acts performed by that code. Also, the user data, which is at the typical user integrity level, will be write-protected against this new process.

Determining the integrity level of data objects can be determined by the user and/or system administrator. Also, an integrity level can also be associated with an existing privilege level. For example, administrators are considered to be more trustworthy than users because they have full control of the system, while authenticated users may be considered more trustworthy than a guest user or anonymous user. Also, users running unknown code downloaded from an unknown source are not very trustworthy and may have a relatively lower integrity level. Therefore, the integrity levels may be associated with these well known user expectations of trustworthiness.

Generally, as discussed above, integrity levels may be assigned to various system components. For example, software component files (e.g., .exe, .dll, etc) may be assigned an object integrity level. Also, various processes (subjects) may be assigned an integrity level based on the user's privilege level and the integrity of the software being executed. In addition, objects such as processes and data files may have an integrity level based on the integrity of the parent process that created the data.

MIC also may operate to enforce integrity boundaries between various privilege levels. For example, MIC may prevent cross-process elevation of privilege through a common procedure known as DLL injection. MIC accomplishes this using multiple security tokens. One token may be used for processes running with least privilege, while the other token may be used for processes running with full privilege. Both tokens may have the same user SID.

Of course, processes started by a non-administrative user have less privilege and should have a lower integrity level than processes started by a full privilege Administrator. Also, lower integrity processes should not be able to modify processes with full privilege and attempt an elevation of privilege attack, nor should they be able to modify data that is created and used by a full privilege process. MIC prevents the lower integrity level from modifying the higher integrity level, even though both processes may share some common attributes of the same user and/or security group.

The novel MIC method also may restrict the ability of untrustworthy code from modifying or destroying user data files. Untrustworthy code, assigned a low integrity level, will have read access to user data files that are assigned a higher integrity level.

The following scenarios help further describe the novel MIC method. It should be appreciated that the following scenarios and examples help further understand the invention. However, the invention is not limited to such examples and scenarios, but are provided merely as examples to help further explain the novel techniques.

Typically, high-risk files may be downloaded via the Internet and saved to a personal directory on the computer system. Even if the browser includes security mechanisms that block running the high-risk file, the user may attempt to execute the file outside of the browser environment. For example, the user may attempt to execute the file using the file directory.

The high-risk file can run virus-containing programs that spread by attaching itself to other documents in the user's personal directory. However, when the virus attempts to open and attach itself to the other documents in the user's personal directory, MIC prevents it from doing so. This is because even though the user owns and has full control access to the documents in the personal directory, the file from which the virus was spread is set with low integrity level and thus cannot open user data files that were created with a higher integrity level (e.g., medium). Often viruses that cannot open files attempt to delete those same files. However, again, the delete operations fail because the delete file operation requires a higher integrity level than the high-risk file can obtain.

Another example occurs when a user with full privilege (e.g., administrative user) creates an administrative script that is protected by an access control list that grants the creating user SID full control. The very same starts a process that opens the script and attempts to modify the contents. The script created by the full privilege process has a higher integrity level. The process has a token with a lower integrity level and therefore cannot modify the administrative script, even though the DACL grants the User SID full control. This is because MIC does not allow the low integrity token to modify a high integrity object.

Even in the circumstance where the process injects code into a full privilege process, MIC protects the full privilege process. For example, a process that has the same user SID as a full privilege process can inject .dll code into another process and attempt to use the full privilege process to elevate privilege. However, because the full privilege process has a higher integrity level than the process, the process will not be able to obtain a handle to a higher integrity process to modify access.

Another example of the operation of MIC occurs when an administrator with full privileges downloads code from the Internet to a local system. The downloaded code is assigned a low integrity level. While other strict mandatory integrity policy mechanisms may prevent the administrator from executing the code at all, the novel MIC allows the administrator to execute the code. This is because the process token that the untrusted code executes with is low integrity and cannot modify system data, which is at a higher integrity level. Therefore, administrative users can execute unsigned, low integrity code in a process with low integrity and be protected without having to prevent the user from not being able to execute the code at all.

In order to implement the novel method, objects need be labeled with an integrity SID in order for MIC decisions to be made. As discussed, for each security descriptor that is created, the process will add an integrity ACE to the SACL. The integrity ACE contains the integrity level SID associated with the creator of the security descriptor.

The object manager is likely to be the main caller of this routine. Therefore, the process must verify and check information in the object manager's token. This is the natural location for the labeling to occur. After the integrity ACE is added, the SACL stores the integrity label. The integrity label is a SID and may be stored in the SID field of the ACE. The creation of mandatory ACEs is protected by its presence in the SACL because security access is required to modify the SACL (e.g., raising or lowering the integrity level of an object). Also, modification of the SACL is the type of operation (e.g., Write) that is protected by the MIC process itself. For example, a call to modify the SACL will not be able to replace the integrity label-bearing SACL with a new SACL that lacks an integrity ACE.

The novel method also allows an administrator, for example, to assert a new security privilege that allows the administrator to change the integrity level of an object. For example, administrators often need to delete a system integrity file or clean up system level integrity registry keys left behind by a poorly behaved uninstall program. In order to accomplish this task, the object's integrity level need be lowered to the level in the administrator's token. In order to accomplish this, the novel MIC method creates a new privilege specifically for the purpose described above. This privilege may be granted to the administrator account by default.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. An integrity level method, comprising:
creating a user token when a user logs onto a computer system, the user token containing a user integrity level;
assigning a process a process integrity level, the process being executable in the computer system, the process integrity level being based on at least an integrity level of software at which the software would be executed by the process;
executing the process at an execution integrity level, the execution integrity level being based on a comparison between the user integrity level and the process integrity level;
assigning an object in the computer system an object integrity level, the object integrity level being added to a system access control list; and
in response to receiving a request to access the object made by the user, granting access to the object based on a comparison between the object integrity level and an integrity level designator associated with the request, the integrity level designator being based on the user integrity level contained in the user token, the process integrity level, and the execution integrity level.

2. The method of claim 1, wherein the integrity level designator is the user integrity level, and wherein the user integrity level is compared with the object integrity level.

3. The method of claim 1, wherein the process integrity level is further based on the user integrity level.

4. The method of claim 1 wherein the request to access the object is made by the process, wherein the integrity level designator is the process integrity level, and wherein the process integrity level is compared with the object integrity level.

5. The method of claim 1, wherein the user token includes more than one integrity level designator in a list of access permission groups.

6. The method of claim 3, wherein the integrity level designator of the user token is set to a lower integrity level, if the object integrity level of the executable image file used to create the process has an object integrity level that is lower than the process.

7. The method of claim 1, wherein the system access control list is comprised in a system control data security structure.

8. The method of claim 7, wherein the system access control list includes an access control entry, and wherein the access control entry comprises the integrity level.

9. The method of claim 1, wherein the integrity level designator is defined in a security ID, and wherein the security ID is located within the list of access permission groups of the token.

10. The method of claim 1, wherein the integrity level designator is defined in a security ID, and wherein the security ID is located within a system access control list.

11. A system for implementing mandatory integrity control in a computing environment, comprising:
a processor coupled to one or more memories, the one or memories comprising:
a system access control list located within a security descriptor;
a security ID designated as an access control entry in the system access control list; and
a relative identifier included within the security ID, wherein the relative identifier defines an integrity level for the mandatory integrity control, and
the one or memories having stored thereon instructions that when operating on the processor cause the processor to:

create a token when a user logs onto the computing environment containing one or more user integrity level designators;

apply one or more process integrity level designators to a process executable within the computing environment, the one or more process integrity level designators based on at least an integrity level of software at which the software would be executed by the process;

execute the process at one or more execution integrity level designators, the one or more execution integrity level designators being based on a comparison between the one or more user integrity level designators and the one or more process integrity level designators; and apply the relative identifier to an existing data security structure in one or more objects in the computing environment; and grant access to the object based on a comparison between the relative identifier and the one or more user integrity level designators, the one or more process integrity level designators, and the one or more execution integrity level designators.

12. The system of claim 11, wherein the integrity level represented by a security ID has the following form S-1-16-xxxx.

13. The system of claim 11, wherein the user integrity level designator is defined in a security ID, and wherein the security ID is located within the list of access permission groups of the token.

14. The system of claim 11, wherein the user integrity level designator is defined in a security ID, and wherein the security ID is located within the system access control list.

15. The system of claim 11, wherein an integrity level security ID is applied to each object in a computer system that has an existing security descriptor.

16. A computer readable storage device for storing instructions that when executed by a processor cause the processor to perform the steps of:

assigning computer security information represented by an existing security data structure with an object in a computing environment;

providing a system access control list to the security data structure;

adding an access control list integrity level designator to the system access control list;

adding a user integrity level designator to a user token;

adding a process integrity level designator to a process executable within the computing environment, the process integrity level being based on an integrity level of software at which the software would be executed by the process;

executing the process at an execution integrity level, the execution integrity level being based on a comparison between the user integrity level designator contained in the user token and the process integrity level designator; and granting access to the object based on a comparison between the access control list integrity level and the user integrity level designator, the process integrity level designator, and the execution integrity level.

17. The computer readable storage medium of claim 16, wherein the access control list integrity level designator is defined in a security ID, and wherein the security ID is located within the list of access permission groups of a token.

18. The computer readable storage medium of claim 17, wherein users associated with user tokens and processes and objects in the computing environment are granted access to other, processes, and objects by a mandatory integrity control system based on:

the integrity level of the user token, process, or object trying to gain access;

the integrity level of the process, or object they are trying to access; and the type of access they are trying to gain.

* * * * *